UNITED STATES PATENT OFFICE.

FRIEDRICH SGALITZER, OF VIENNA, AUSTRIA.

MANUFACTURE OF A FOOD PREPARATION FROM FRESH BLOOD.

1,380,427.     Specification of Letters Patent.     Patented June 7, 1921.

No Drawing.     Application filed June 22, 1920. Serial No. 390,968.

*To all whom it may concern:*

Be it known that I, FRIEDRICH SGALITZER, residing at Vienna, Austria, III, Neulinggasse 10/13, have invented certain new and useful Improvements in the Manufacture of a Food Preparation from Fresh Blood, of which the following is a specification.

This invention relates to the manufacture of a durable, easily digested food preparation from fresh blood. Processes of the kind hitherto known have produced only chemically altered products, or such as could subsequently be used as pharmaceutical agents or nutritious preparations; by the present invention all the substances contained in the blood, except the fibrin, are transmuted, in a chemically unaltered condition, into a durable, easily digestible solid form, soluble in water. The final product contains all the albumen of the blood, as also all the other constituents of the blood, in the form of an odorless, tasteless powder, of a red-brown to chocolate color. In connection with the present process, it is of peculiar importance, that it is not always necessary to eliminate the fibrin from the blood before treating the latter, so that the nourishing quality of the final product may be considerably enhanced.

In some cases it may be advantageous to eliminate the fibrin, which is the only insoluble constituent of the preparation.

The process comprises substantially two steps, the first of which consist in bursting or tearing the stroma surrounding the blood corpuscles.

The disruption of the corpuscles constituting the first step may be attained by thoroughly freezing and then again thawing the blood. This freezing and thawing of the blood is a known operation, but has hitherto only been applied with the object of bursting the corpuscles to allow the hemoglobin contained in them to pass out into the blood serum, with the object of subsequently separating the hemoglobin in some suitable manner, or of proving its presence in the blood, or of rendering it directly accessible to the attack of chemical reagents. In the present invention the sole object of the freezing and thawing is to burst the stroma, that is, to render it of no effect, since otherwise it would not be possible to use the hereinafter described method of drying to form a product having the properties herein set forth.

It is, however, within the scope of the present invention to effect this removal of the stroma for the purpose specified, by means of other known mechanical or chemical disruption, such, for instance, as by highly diluting the blood with water, or by treating it with water *in vacuo* or in moderate heat, or by subjecting it to the action of the electric current or treating it in a centrifugal machine, or by adding to it ether, chloroform, spirits, water containing spirits, acetic acid, ethylester, amylalcohol or ammoniac. The latter methods are in some cases more advantageous, particularly when the drying process according to the present invention has to be carried out in slaughter houses having no cooling plant.

The drying operation, constituting the second step of the treatment, is carried out in a vacuum on surfaces heated to a temperature above the coagulating temperature of the albumens.

Drying the undecomposed blood in a vacuum is a step known of itself. In the present case, however, the invention does not consist simply in drying the blood as supplied by the slaughter houses, but in drying the blood after it has been treated according to the first step of the present process, that is with completely ruptured stroma. Only by combining the two steps is it possible to attain the previously mentioned soluble, durable-blood preparation, which may be used in the same manner as fresh blood.

The process may be advantageously carried out in the following manner:—From the blood from the slaughtered cattle, the fibrin is first separated in the known manner, to prevent coagulation, advantageously by stirring the blood. The fibrin which now floats in the blood may be removed, although this is not absolutely necessary, since it in no way affects the subsequent treatment. The mass is then thoroughly frozen and subsequently thawed in order to rupture the corpuscles and render the stroma of no effect, by which means the final product is rendered more easily digestible than would be the case with fresh blood.

The blood thus treated is then dried in a vacuum in any suitable manner, but preferably so that on the one hand the liquid in the blood is vaporized as quickly and suddenly as possible, in layers and continuously, and on the other hand the pulverulent preparation formed by the vaporization is not heated beyond 40° C., which temperature may be considered to form the limit, in view of the desired high degree of solubility of the preparation in water.

The blood is advantageously dried in an evacuated receptacle in which rotates a drum heated by steam or in any other suitable manner. The drum is immersed to a certain depth in the blood and, in rotating, raises thin layers of the liquid, so that the water contained therein immediately evaporates on the heated drum. The vacuum should be adjusted so that the water is evaporated at about 30° C. in order to prevent the powder from becoming heated beyond the aforesaid limit of 40° C. during its contact with the heated drum.

The blood product may be scraped off the drum by means of any suitable scraper mechanism.

Having now particularly described and ascertained the nature of my said invention and in what manner the same is to be performed, I declare that what I claim is:—

1. A manufacture of an easily digestible, durable and soluble preparation from blood, from which the fibrin has been caused to separate to prevent coagulation, wherein the blood corpuscles are at first disrupted, then dried in a vacuum on surfaces heated to a temperature above the coagulating temperatures of the albumens, the degree of vacuum being such that the liquid is evaporated at about 30° C. while the substance being dried is not heated above 40° C.

2. A manufacture of an easily digestible, durable and soluble preparation from blood, from which the fibrin has been caused to separate to prevent coagulation, wherein the blood is first frozen, then thawed, then dried in a vacuum on surfaces heated to a temperature above the coagulating temperatures of the albumens, the degree of vacuum being such that the liquid is evaporated at about 30° C. while the substance being dried is not heated above 40° C.

In testimony whereof I affix my signature in presence of two witnesses.

Dr. Ing. FRIEDRICH SGALITZER.

Witnesses:
KARL SOIHA,
K. KUTHAN.